US012322862B2

(12) United States Patent
Zhang et al.

(10) Patent No.: US 12,322,862 B2
(45) Date of Patent: Jun. 3, 2025

(54) LENS ANTENNA, LENS ANTENNA ARRAY, RADIO DEVICE AND METHOD PERFORMED BY RADIO DEVICE

(71) Applicant: Telefonaktiebolaget LM Ericsson (publ), Stockholm (SE)

(72) Inventors: Zhan Zhang, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 103 days.

(21) Appl. No.: 18/039,190

(22) PCT Filed: Apr. 30, 2021

(86) PCT No.: PCT/SE2021/050406
§ 371 (c)(1),
(2) Date: May 26, 2023

(87) PCT Pub. No.: WO2022/119487
PCT Pub. Date: Jun. 9, 2022

(65) Prior Publication Data

US 2024/0055772 A1 Feb. 15, 2024

(30) Foreign Application Priority Data

Dec. 2, 2020 (WO) ................ PCT/CN2020/133221

(51) Int. Cl.
*H01Q 15/02* (2006.01)
*H01Q 19/06* (2006.01)

(52) U.S. Cl.
CPC ............ *H01Q 15/02* (2013.01); *H01Q 19/06* (2013.01)

(58) Field of Classification Search
CPC ........ H01Q 15/02; H01Q 19/06; H01Q 25/00; H04B 7/04; H04B 7/0452; H04B 7/06
See application file for complete search history.

(56) References Cited

U.S. PATENT DOCUMENTS 2,822,541 A * 2/1958 Westbrook ............ H01Q 15/02 343/786
4,490,723 A * 12/1984 Hardie ................ H01Q 25/008 343/754

(Continued)

OTHER PUBLICATIONS

PCT International Search Report and Written Opinion, mailed Jul. 29, 2021, for International Application No. PCT/SE2021/050406, 10 pages.

(Continued)

*Primary Examiner* — Tho G Phan
(74) *Attorney, Agent, or Firm* — Sage Patent Group

(57) ABSTRACT

A lens antenna and a lens antenna array are disclosed. A radio device and a method performed by the radio device are also disclosed. The lens antenna may include a lens, and two or more sets of antenna elements which are respectively disposed on two or more imaginary surfaces on a lateral side of the lens. The two or more imaginary surfaces may have different distances to a center point of the lens. The lens antenna array may include a plurality of lens antennas described above. The antenna elements in the plurality of lens antennas may be disposed on a same lateral side of the lenses in the plurality of lens antennas. A method for selecting antenna elements is performed by the radio device controlling the lens antenna or lens antenna array, when the lens antenna or lens antenna array operates as transmission or reception radio antennas.

18 Claims, 10 Drawing Sheets

(56) References Cited

U.S. PATENT DOCUMENTS

| | | | | |
|---|---|---|---|---|
| 5,748,151 | A * | 5/1998 | Kingston | H01Q 17/001 343/753 |
| 6,195,058 | B1 * | 2/2001 | Nakamura | H01Q 19/08 343/753 |
| 6,982,676 | B2 * | 1/2006 | Sievenpiper | H01Q 19/062 343/754 |
| 10,116,058 | B2 * | 10/2018 | Oh | H01Q 19/062 |
| 11,605,905 | B2 * | 3/2023 | Turpin | H01Q 3/46 |
| 2012/0099856 | A1 | 4/2012 | Britz et al. | |
| 2018/0159244 | A1 | 6/2018 | Tzuang et al. | |
| 2019/0181926 | A1 | 6/2019 | Liang et al. | |

OTHER PUBLICATIONS

Zeng, Wong et al, "Millimeter Wave MIMO with Lens Antenna Array: A New Path Division Multiplexing Paradigm," IEEE Transaction Communication, vol. 64, No. 4, Apr. 2016, pp. 1557-1571.

Bjornson, Emil et al, "Massive MIMO is a Reality—What is Next ?: Five Promising Research Directions for Antenna Arrays," Digital Signal Process, arXiv:1902.07678v2, Jun. 12, 2019, 20 pages.

* cited by examiner

LENS ANTENNA, LENS ANTENNA ARRAY, RADIO DEVICE AND METHOD PERFORMED BY RADIO DEVICE

CROSS-REFERENCE TO RELATED APPLICATIONS

This application is a 35 U.S.C § 371 national stage application for International Application No. PCT/SE2021/050406, entitled "LENS ANTENNA, LENS ANTENNA ARRAY, RADIO DEVICE AND METHOD PERFORMED BY RADIO DEVICE," filed on Apr. 30, 2021, which claims priority to International Application No. PCT/CN2020/133221, filed on Dec. 2, 2020 assigned to the assignee hereof, and expressly incorporated herein by reference.

TECHNICAL FIELD

Embodiments of the disclosure generally relate to communication, and, more particularly, to a lens antenna, a lens antenna array, a radio device and a method performed by the radio device.

BACKGROUND

This section introduces aspects that may facilitate better understanding of the present disclosure. Accordingly, the statements of this section are to be read in this light and are not to be understood as admissions about what is in the prior art or what is not in the prior art.

FIG. 1 illustrates a conventional lens antenna. This figure is excerpted from https://www.everythingrf.com/community/what-is-a-lens-antenna. As shown in FIG. 1, the lens could help to narrow the width of the radiation beam from the point source. Therefore, it could help to form the beam needed to improve the signal strength at an intended receiver. Since lens is a power-less device, it might provide a robust performance (maybe cost-effective depending on radio frequencies) and offer a quite promising value for the 5th generation (5G) or 6th generation (6G) radio cellular communications.

FIG. 2 illustrates a conventional lens antenna and its beam direction control by antenna selection. This figure is excerpted from "Millimeter Wave MIMO With Lens Antenna Array: A New Path Division Multiplexing Paradigm" by Yong Zeng, & Rui Zhang, IEEE Trans. Comm., Vol. 64, No. 4, April 2016. As shown in FIG. 2, the antenna elements could be arranged and mounted in a focal-point sphere, so that for different directions of arrival (DoAs) or directions of departure (DoDs), a certain antenna element could be selected.

FIG. 3 illustrates a conventional large aperture antenna array (LAAA). This figure is excerpted from "Massive MIMO is a Reality—What is Next? Five Promising Research Directions for Antenna Arrays" by Emil Bjornson, et al., arXiv:1902.07678v2 [eess.SP], 12 Jun. 2019. As shown in FIG. 3, a whole side of the building is mounted with a big LAAA (denoted by (b)) to realize massive multiple input multiple output (MIMO) engineering. The aperture of the LAAA is quite larger than ordinary antenna arrays such as the compact co-located massive MIMO arrays denoted by (a), so that it could enhance the spatial MIMO performance in a much higher order than conventional antennas or antenna arrays.

Conceptually, the size of an LAAA could range from several hundreds of centimeters to several tens of meters. It can exhibit good interference suppression, wide coverage with superior signal to interference plus noise ratio (SINR) improvement due to much higher dimensions in spatial domain. Thus, it is one of the key tools to leverage the 5G evolution gain or 6G gain to a higher level.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved lens antenna/lens antenna array. In particular, one of the problems to be solved by the disclosure is that the existing lens antenna/lens antenna array only provides a fixed and narrow beam width which is not suitable for cellular communication scenario.

According to a first aspect of the disclosure, there is provided a lens antenna. The lens antenna may comprise a lens, and two or more sets of antenna elements which are respectively disposed on two or more imaginary surfaces on a lateral side of the lens. The two or more imaginary surfaces may have different distances to a center point of the lens.

In this way, it is possible to provide a desirable beam width for cellular communication scenario.

In an embodiment of the disclosure, each of the two or more imaginary surfaces may be a curved surface.

In an embodiment of the disclosure, the curved surface may be a spherical surface.

In an embodiment of the disclosure, each of the two or more imaginary surfaces may be a planar surface.

In an embodiment of the disclosure, the distance from one of the two or more imaginary surfaces to the center point of the lens may be a focal length of the lens. The distance from a different one of the two or more imaginary surfaces to the center point of the lens may be larger or smaller than the focal length of the lens.

In an embodiment of the disclosure, the distance from each of the two or more imaginary surfaces to the center point of the lens may be larger or smaller than the focal length of the lens.

According to a second aspect of the disclosure, there is provided a lens antenna array. The lens antenna array may comprise a plurality of lens antennas according to the above first aspect. The antenna elements in the plurality of lens antennas may be disposed on a same lateral side of the lenses in the plurality of lens antennas.

In this way, it is possible to provide a desirable beam width for cellular communication scenario.

According to a third aspect of the disclosure, there is provided a lens antenna array. The lens antenna array may comprise a first sub-array of first lens antennas each comprising a first lens, and a first set of antenna elements disposed on a first imaginary surface on a lateral side of the first lens. The lens antenna array may further comprise a second sub-array of second lens antennas each comprising a second lens, and a second set of antenna elements disposed on a second imaginary surface on the same lateral side of the second lens. The first lens antennas may differ from the second lens antennas in one of: a distance from the imaginary surface to a center point of the lens; or a focal length of the lens.

In this way, it is possible to provide a desirable beam width for cellular communication scenario.

In an embodiment of the disclosure, each of the first and second imaginary surfaces may be a curved surface.

In an embodiment of the disclosure, the curved surface may be a spherical surface.

In an embodiment of the disclosure, each of the first and second imaginary surfaces may be a planar surface.

In an embodiment of the disclosure, a distance from the first imaginary surface to a center point of the first lens may be a focal length of the first lens. A distance from the second imaginary surface to a center point of the second lens may be larger or smaller than a focal length of the second lens.

In an embodiment of the disclosure, a distance from the first imaginary surface to a center point of the first lens may be larger or smaller than a focal length of the first lens. A distance from the second imaginary surface to a center point of the second lens may be a focal length of the second lens.

In an embodiment of the disclosure, a distance from the first imaginary surface to a center point of the first lens may be larger or smaller than a focal length of the first lens. A distance from the second imaginary surface to a center point of the second lens may be larger or smaller than a focal length of the second lens.

According to a fourth aspect of the disclosure, there is provided a radio device. The radio device may comprise a lens antenna according to the above first aspect or a lens antenna array according to the above second or third aspect.

In this way, it is possible to provide a desirable beam width for cellular communication scenario.

In an embodiment of the disclosure, the radio device may be further configured to determine a target subset of the antenna elements of the lens antenna or the lens antenna array which is to be used for signal transmission or reception.

In an embodiment of the disclosure, the radio device may comprise the lens antenna according to the above first aspect and may be further configured to determine the target subset which is to be used for signal transmission by being configured to: select one of the two or more sets of antenna elements which is disposed on one of the two or more imaginary surfaces, based on a size of a beam coverage for use in the signal transmission.

In an embodiment of the disclosure, the radio device may comprise the lens antenna array according to the above second aspect, and may be further configured to determine the target subset which is to be used for signal transmission by being configured to: select, for each of the plurality of lens antennas, one of the two or more sets of antenna elements which is disposed on one of the two or more imaginary surfaces, based on a size of a beam coverage for use in the signal transmission.

In an embodiment of the disclosure, the radio device may comprise the lens antenna array according to the above third aspect, and may be further configured to determine the target subset which is to be used for signal transmission by being configured to: select one of the first sub-array and the second sub-array, based on a size of a beam coverage for use in the signal transmission.

In an embodiment of the disclosure, the radio device may be further configured to determine the target subset which is to be used for signal transmission by being configured to: select a portion of the selected antenna elements, based on at least one of a beam elevation and a beam azimuth.

In an embodiment of the disclosure, the radio device may be further configured to determine the target subset which is to be used for signal reception by being configured to: select, as the target subset, a portion of the antenna elements of the lens antenna or the lens antenna array which has a signal reception strength greater than or equal to a predetermined threshold.

In an embodiment of the disclosure, the radio device may be further configured to determine the target subset which is to be used for signal transmission or reception by being configured to: select, as the target subset, the whole antenna elements of the lens antenna or the lens antenna array.

In an embodiment of the disclosure, the radio device may be one of: an active antenna system (AAS); and a base station.

According to a fifth aspect of the disclosure, there is provided a method performed by a radio device. The radio device may comprise a lens antenna according to the above first aspect or a lens antenna array according to the above second or third aspect. The method may comprise determining a target subset of the antenna elements of the lens antenna or the lens antenna array which is to be used for signal transmission or reception.

In this way, it is possible to flexibly control the signal transmission or reception.

In an embodiment of the disclosure, the radio device may comprise the lens antenna according to the above first aspect. Determining the target subset which is to be used for signal transmission may comprise selecting one of the two or more sets of antenna elements which is disposed on one of the two or more imaginary surfaces, based on a size of a beam coverage for use in the signal transmission.

In an embodiment of the disclosure, the radio device may comprises the lens antenna array according to the above second aspect. Determining the target subset which is to be used for signal transmission may comprise selecting, for each of the plurality of lens antennas, one of the two or more sets of antenna elements which is disposed on one of the two or more imaginary surfaces, based on a size of a beam coverage for use in the signal transmission.

In an embodiment of the disclosure, the radio device may comprise the lens antenna array according to the above third aspect. Determining the target subset which is to be used for signal transmission may comprise selecting one of the first sub-array and the second sub-array, based on a size of a beam coverage for use in the signal transmission.

In an embodiment of the disclosure, determining the target subset which is to be used for signal transmission may further comprise selecting a portion of the selected antenna elements, based on at least one of a beam elevation and a beam azimuth.

In an embodiment of the disclosure, determining the target subset which is to be used for signal reception may comprise selecting, as the target subset, a portion of the antenna elements of the lens antenna or the lens antenna array which has a signal reception strength greater than or equal to a predetermined threshold.

In an embodiment of the disclosure, determining the target subset which is to be used for signal transmission or reception may comprise selecting, as the target subset, the whole antenna elements of the lens antenna or the lens antenna array.

According to a sixth aspect of the disclosure, there is provided a radio device. The radio device may comprise a lens antenna according to the above first aspect or a lens antenna array according to the above second or third aspect. The radio device may comprise at least one processor and at least one memory. The at least one memory may contain instructions executable by the at least one processor, whereby the radio device may be operative to determine a target subset of the antenna elements of the lens antenna or the lens antenna array which is to be used for signal transmission or reception.

In this way, it is possible to flexibly control the signal transmission or reception.

In an embodiment of the disclosure, the radio device may be operative to perform the method according to the above fifth aspect.

According to a seventh aspect of the disclosure, there is provided a computer program product. The computer program product may comprise instructions which when executed by at least one processor, cause the at least one processor to perform the method according to the above fifth aspect.

According to an eighth aspect of the disclosure, there is provided a computer readable storage medium. The computer readable storage medium may comprise instructions which when executed by at least one processor, cause the at least one processor to perform the method according to the above fifth aspect.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

In general application of lens antenna, micro-wave stationary point to point communication is a major use case. However, as the lens shape and its distance to the antenna elements are fixed so that the antenna elements are usually placed in a focal point or focal sphere and consequentially the resulting beam-shape is fixed and has a very narrow beam width.

In contrast to the microwave point to point stationary system, at a cellular communication scenario, due to either coverage consideration or UE mobility, the beam width is desirably adjustable and wider than any of radar application or point to point application. However, this feature cannot be provided by the current lens antenna with a structure as it is.

Secondly, although the spatial dimension and the large number of antenna elements are capable of bringing substantial MIMO gains, LAAA with massive planar antenna elements has quite high complexity and power consumption. In addition, the high complexity in the structure of the antenna array is also companied with a high dimension of spatial processing at baseband, which involves a highly costly computation, such as spatial weighting and combining.

The present disclosure proposes an improved solution for a lens antenna/lens antenna array, a radio device and a method performed by the radio device. Hereinafter, the solution will be described in detail with reference to FIGS. 4-17.

Figure 1:
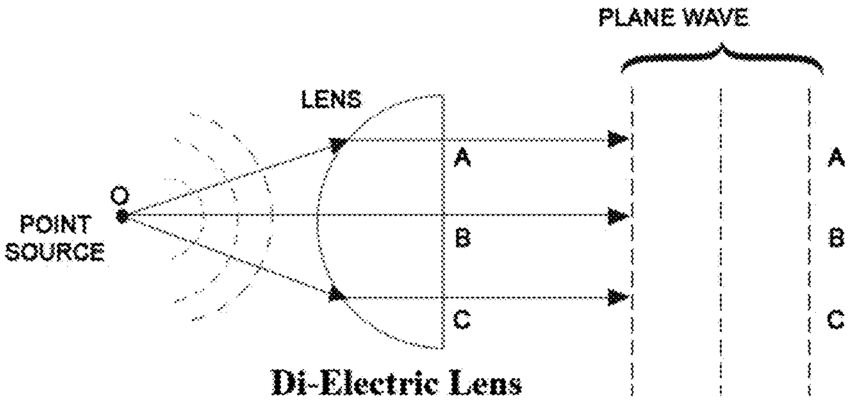
FIG. 1 (PRIOR ART)
FIG. 1 is a diagram illustrating a conventional lens antenna.
Figure 2:
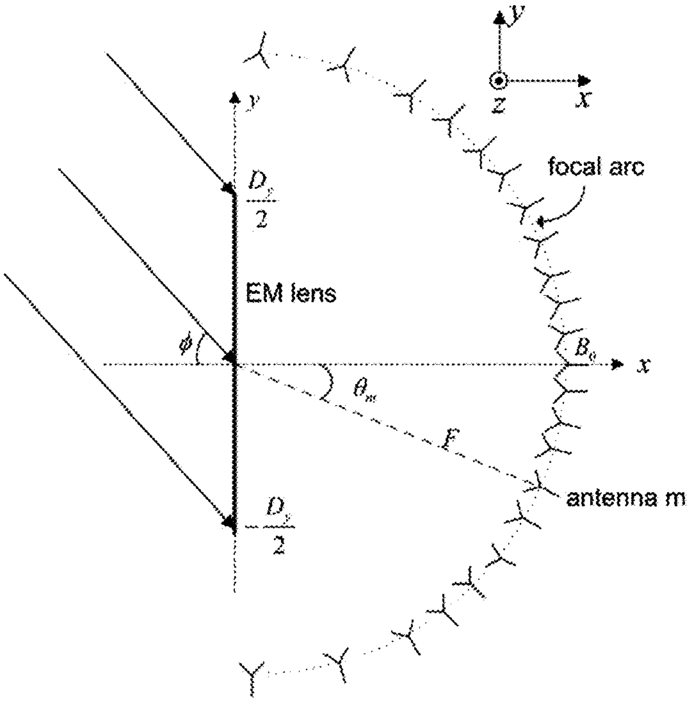
FIG. 2 (PRIOR ART)
FIG. 2 is a diagram illustrating the beam direction control by antenna selection in a conventional lens antenna.
Figure 3:
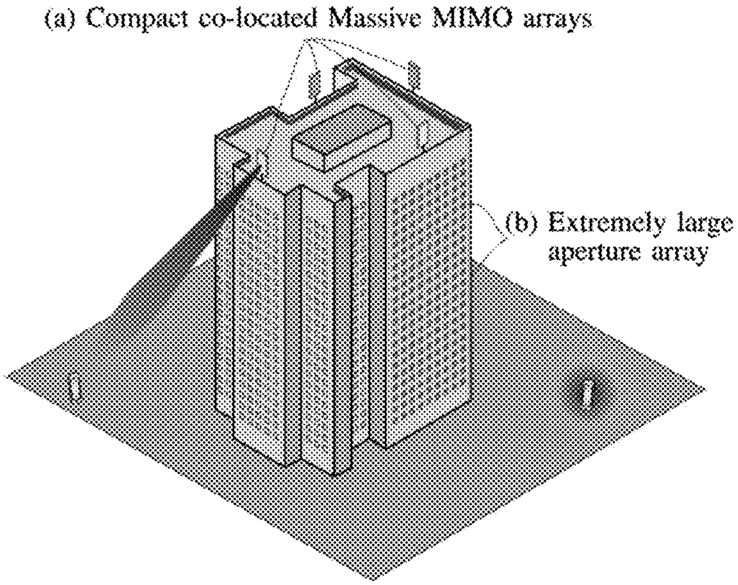
FIG. 3 (PRIOR ART)
FIG. 3 is a diagram illustrating a conventional LAAA.
Figure 4:
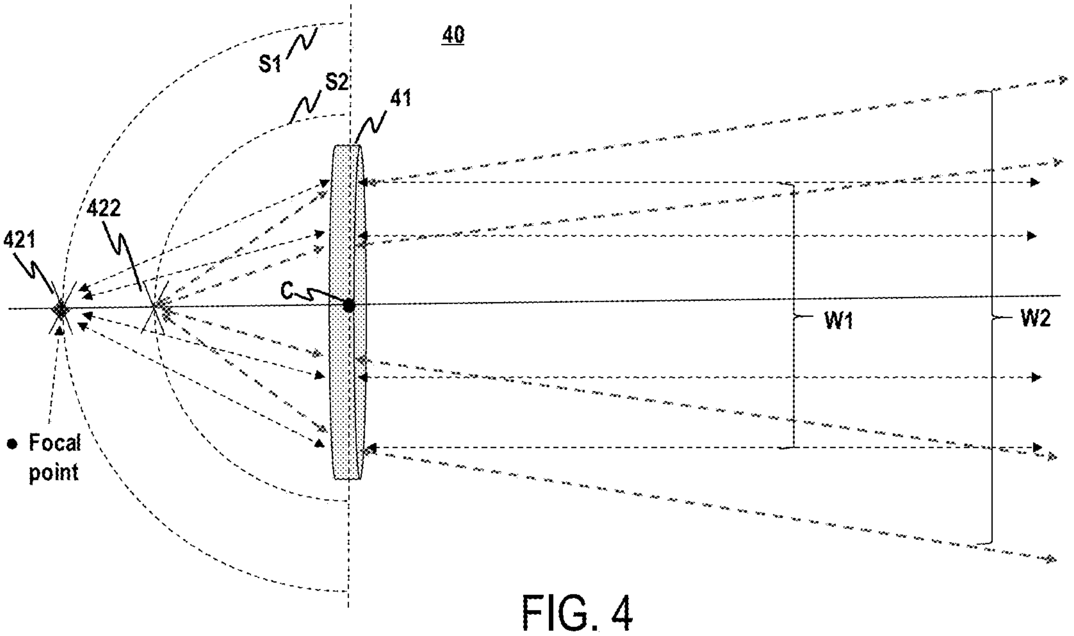
FIG. 4 is a diagram illustrating a lens antenna according to an embodiment of the disclosure.

FIG. 4 is a diagram illustrating a lens antenna according to an embodiment of the disclosure. As shown, the lens antenna 40 comprises: a lens 41, and two sets 421, 422 of antenna elements which are respectively disposed on two imaginary spherical surfaces S1, S2 on a lateral side of the lens 41. Any one of various existing lenses (e.g. dielectric lens, metal plate lens, etc.) or future developed lenses for lens antenna/lens antenna array may be used as the lens 41. It is also possible that a combination of multiple lenses may be used as the lens 41. Each of the two sets 421 and 422 includes a pair of antenna elements with cross-polarizations. The antenna elements may be disposed on the imaginary spherical surfaces by using various fastening methods. For example, a frame made from radio wave-transparent material (e.g. plastic material) may be used to fix the positions of the antenna elements relative to the lens. The distance from the imaginary spherical surface S1 to a center point C of the lens 41 is a focal length of the lens 41. The distance from the imaginary spherical surface S2 to the center point C of the lens 41 is smaller than the focal length of the lens 41. Thus, the two imaginary surfaces S1 and S2 have different distances to the center point C of the lens 41. Due to the different distances to the center point of the lens, a beam width W1 corresponding to the set 421 and a wider beam width W2 corresponding to the set 422 can be obtained. Consequently, it is possible to provide a desirable beam width for cellular communication scenario.

Compared with the conventional lens antenna, additional antenna element(s) (e.g. antenna element pair(s)) are added in different distance(s) to the lens center in the above embodiment. In other words, additional antenna element(s) are placed in a distribution along the axis through the lens center and each of the additional antenna element(s) could be distant to the lens center with various distance(s).

Figure 5:
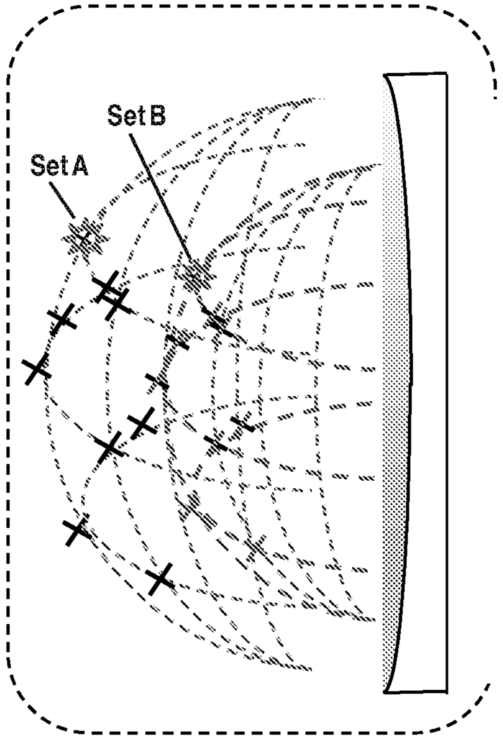
FIG. 5 is a diagram illustrating a lens antenna according to an embodiment of the disclosure.

FIG. 5 is a diagram illustrating a lens antenna according to an embodiment of the disclosure. As shown, the embodiment of FIG. 5 is similar to the embodiment of FIG. 4 and the difference between the two embodiments lie in that a plurality pairs of antenna elements with cross-polarizations are included in each of the two sets (Set A and Set B) in the embodiment of FIG. 5. That is, multiple antenna element pairs are placed on each of the spherical surfaces with different diameters, where the centers of the spherical surfaces collocate with the lens center. This adds a new sphere-dimension of antenna elements. In this sense, the lens antenna of FIG. 5 may also be called three dimensional (3D) lens antenna, where the three dimensions may refer to spherical surface, elevation, and azimuth.

Since different spherical surfaces (corresponding to Set A and Set B respectively) have different distances to the lens center, the beam width (or beam shape) can be changed from one to another (e.g. from W1 to W2 shown in FIG. 4, or vice versa) if the antenna elements on the spherical surface A or B are selected as active radio antenna elements. For example, if surface A set of antenna elements are selected to be active, the resulting beam is narrow as a pencil beam since the surface A is a focal-point sphere. In contrast, if surface B set of antenna elements are selected to be active, the consequential beam width is wider than that with the surface A, since the antenna elements within the set B are relatively closer to the lens center than those located at the surface A. Thus, multiple such spherical surfaces could enable an electrical beam width management by surface selection.

Figure 6:
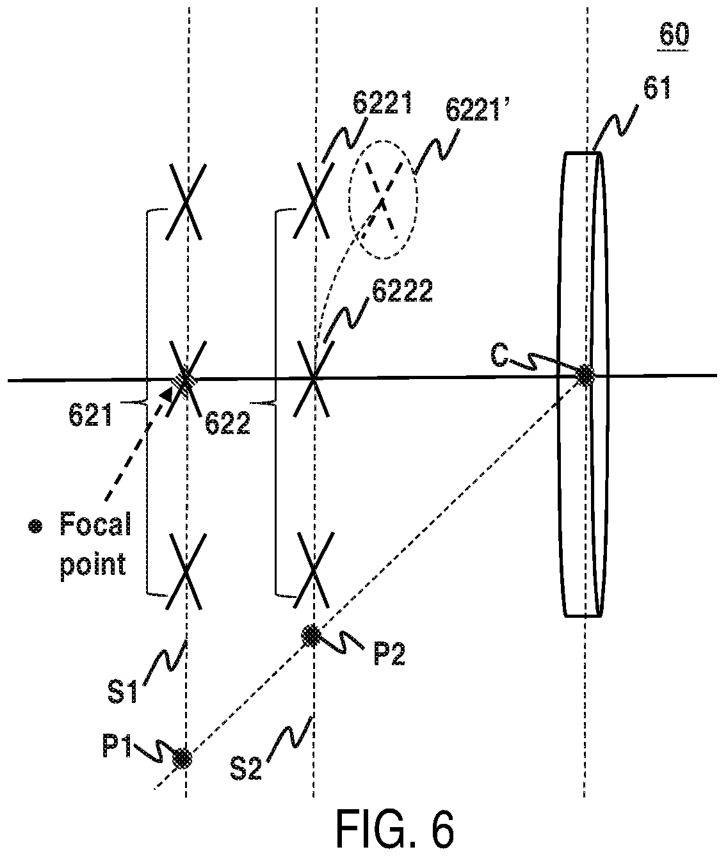
FIG. 6 is a diagram illustrating a lens antenna according to an embodiment of the disclosure.

FIG. 6 is a diagram illustrating a lens antenna according to an embodiment of the disclosure. As shown, the lens antenna 60 comprises: a lens 61, and two sets 621, 622 of antenna elements which are respectively disposed on two imaginary planar surfaces S1, S2 on a lateral side of the lens 61. Suppose that a line is drawn from the center point C of the lens 61 towards the two imaginary planar surfaces S1 and S2, and the intersection points between the line and the two surfaces S1 and S2 are P1 and P2 respectively. Then, the distance between P1 and C may be referred as the distance from the surface S1 to the center point C of the lens 61 in this direction. The distance between P2 and C may be referred as the distance from the surface S2 to the center point C of the lens 61 in this direction. If the line from the center point C towards the two surfaces S1 and S2 sweeps clockwise or anticlockwise in the paper surface, the two distances from the two surfaces S1 and S2 to the center point C are different from each other in every direction. This can be called that the two imaginary planar surfaces S1 and S2 have different distances to the center point C of the lens 61. In another simplified expression, the two imaginary planar surfaces S1 and S2 have different shortest distances to the center point C of the lens 61.

In the embodiments of FIGS. 4 and 5, due to every antenna element on the imaginary spherical surface having the same distance to the center point of the lens, the resulting beamwidths from the lens in respective output directions in signal transmission scenario are the same with each other. To compare the embodiment of FIG. 6 with the embodiments of FIGS. 4 and 5, suppose that an antenna element pair 6221' is provided as shown in FIG. 6 by using the arrangement manner of the embodiments of FIGS. 4 and 5. Then, because the antenna element pair 6221 has a larger distance to the center point C than the antenna element pair 6221', the beam width corresponding to the antenna element pair 6221 is smaller than the beam width corresponding to the antenna element pair 6221'. This means the beam widths corresponding to different antenna element pairs (cross-polarized elements) on the imaginary planar surface S2 may be different with each other. For example, by performing simulation for the embodiment of FIG. 6, beam widths varying within an acceptable range can be obtained from the antenna element pairs on the same imaginary planar surface.

Figure 7:
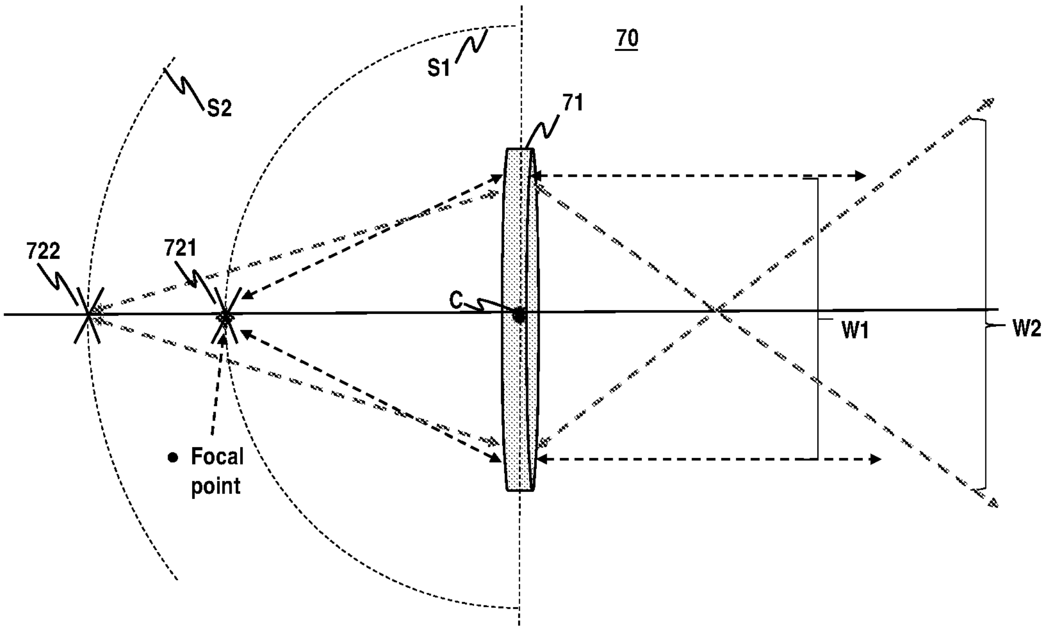
FIG. 7 is a diagram illustrating a lens antenna according to an embodiment of the disclosure.

FIG. 7 is a diagram illustrating a lens antenna according to an embodiment of the disclosure. As shown, the lens antenna 70 comprises: a lens 71, and two sets 721, 722 of antenna elements which are respectively disposed on two imaginary spherical surfaces S1, S2 on a lateral side of the lens 71. Similar to the embodiment of FIG. 4, the distance from the imaginary spherical surface S1 to a center point C of the lens 71 is a focal length of the lens 71. Unlike the embodiment of FIG. 4, the distance from the imaginary spherical surface S2 to the center point C of the lens 71 is larger than the focal length of the lens 71. Similar to the embodiment of FIG. 4, due to the different distances to the center point of the lens, a beam width W1 corresponding to the set 721 and a wider beam width W2 corresponding to the set 722 can be obtained. Consequently, it is possible to provide a desirable beam width for cellular communication scenario.

Figure 8:
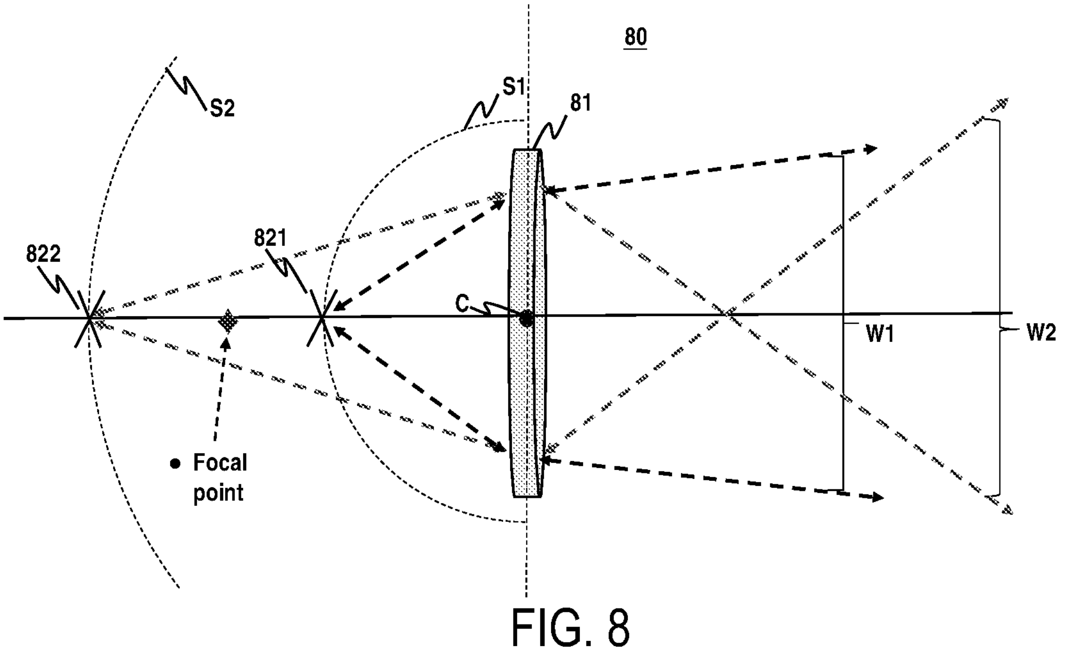
FIG. 8 is a diagram illustrating a lens antenna according to an embodiment of the disclosure.

FIG. 8 is a diagram illustrating a lens antenna according to an embodiment of the disclosure. As shown, the lens antenna 80 comprises: a lens 81, and two sets 821, 822 of antenna elements which are respectively disposed on two imaginary spherical surfaces S1, S2 on a lateral side of the lens 81. The distance from the imaginary spherical surface S1 to a center point C of the lens 81 is smaller than a focal length of the lens 81. The distance from the imaginary spherical surface S2 to the center point C of the lens 81 is larger than the focal length of the lens 81. Due to the different distances to the center point of the lens, a beam width W1 corresponding to the set 821 and a wider beam width W2 corresponding to the set 822 can be obtained. Consequently, it is possible to provide a desirable beam width for cellular communication scenario.

It should be noted that the present disclosure is not limited to the above examples shown in FIGS. 4-8. Firstly, although a pair of antenna elements or a plurality of antenna elements is shown to be included in each of the two sets, each set of antenna elements may include one or more antenna elements. Secondly, the number of the sets may be more than two. Correspondingly, the number of the imaginary (spherical or planar) surfaces may be more than two and the more than two imaginary surfaces may have different distances to the center point of the lens. Thirdly, any other suitable curved surface (e.g. an ellipsoidal surface) besides the spherical surface may be used instead. In this case, the distance from the curved surface to the center point of the lens may be determined in a way similar to that described above for the planar surface. In addition, every imaginary surface may be disposed at the focal point of the lens, or closer to the center point of the lens than the focal point, or farther away from the center point of the lens than the focal point, as long as different imaginary surfaces have different distances to the center point of the lens.

Based on the above description, a first aspect of the disclosure provides a lens antenna. The lens antenna comprises a lens, and two or more sets of antenna elements which are respectively disposed on two or more imaginary surfaces on a lateral side of the lens. The two or more imaginary surfaces have different distances to a center point of the lens.

Figure 9:
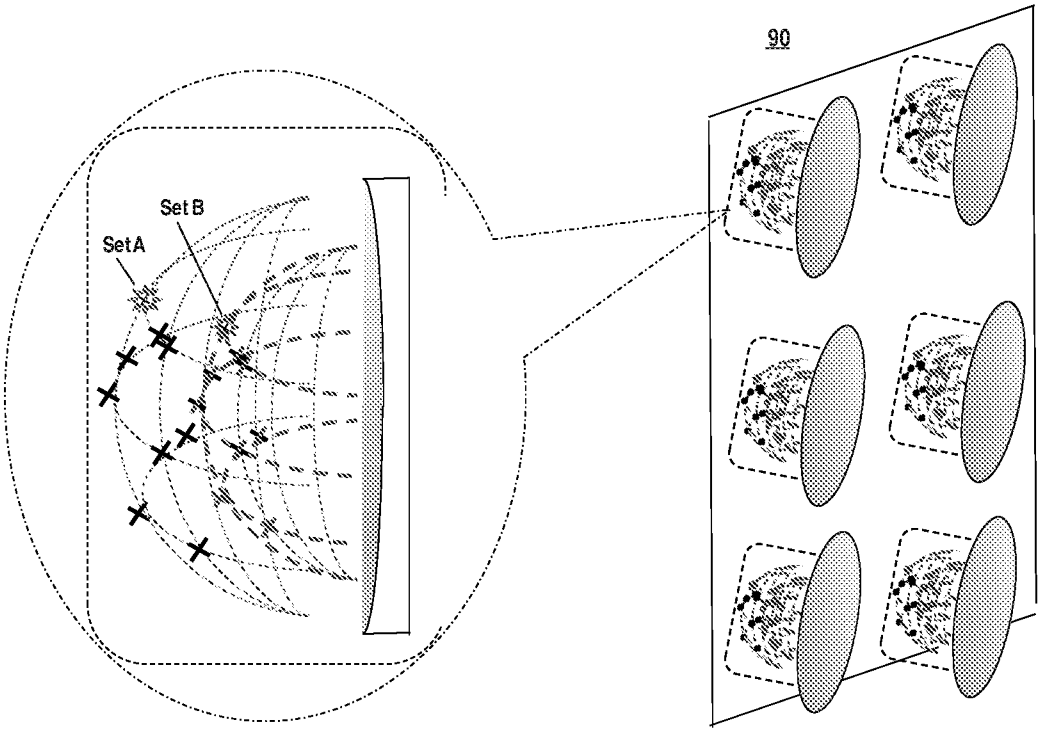
FIG. 9 is a diagram illustrating a lens antenna array according to an embodiment of the disclosure.

FIG. 9 is a diagram illustrating a lens antenna array according to an embodiment of the disclosure. For example, the lens antenna array may be an LAAA. As shown, the lens antenna array 90 comprises a plurality of lens antennas according to the above first aspect. For example, the number of the lens antennas may be any suitable value, depending on the engineering requirements and the target's needs. Each of the plurality of lens antennas may be as shown in any of FIGS. 4-8 so that the same type of lens antennas (which may be called lens antenna sub-arrays) form the lens antenna array. The antenna elements in the plurality of lens antennas are disposed on a same lateral side of the lenses in the plurality of lens antennas. Because the lens antennas described above are included, it is possible to provide a desirable beam width for cellular communication scenario.

For example, for the lens antenna array (e.g. an LAAA) of FIG. 9, antenna activations may be carried out at least between different spherical surfaces. Further, the selections of antenna element activations may be in 3D domains: spherical surfaces, elevation in a sphere and azimuth in a sphere. By such a selection, the selected antenna elements may form an antenna sub-array and the signal processing at baseband is to work with this antenna sub-array. As a result, the spatial dimension can be substantially reduced especially for the LAAA with a lot of elements in total. This could mitigate the complexity of the LAAA by partially replacing traditional complicated analogue beamforming circuitry with lens and antenna selection. Besides, the power saving could be facilitated by the non-powered lens, which is also robust in performance over a long duration of operations.

Based on the above description, a second aspect of the disclosure provides a lens antenna array. The lens antenna array comprises a plurality of lens antennas according to the above first aspect. The antenna elements in the plurality of lens antennas are disposed on a same lateral side of the lenses in the plurality of lens antennas.

Figure 10A:
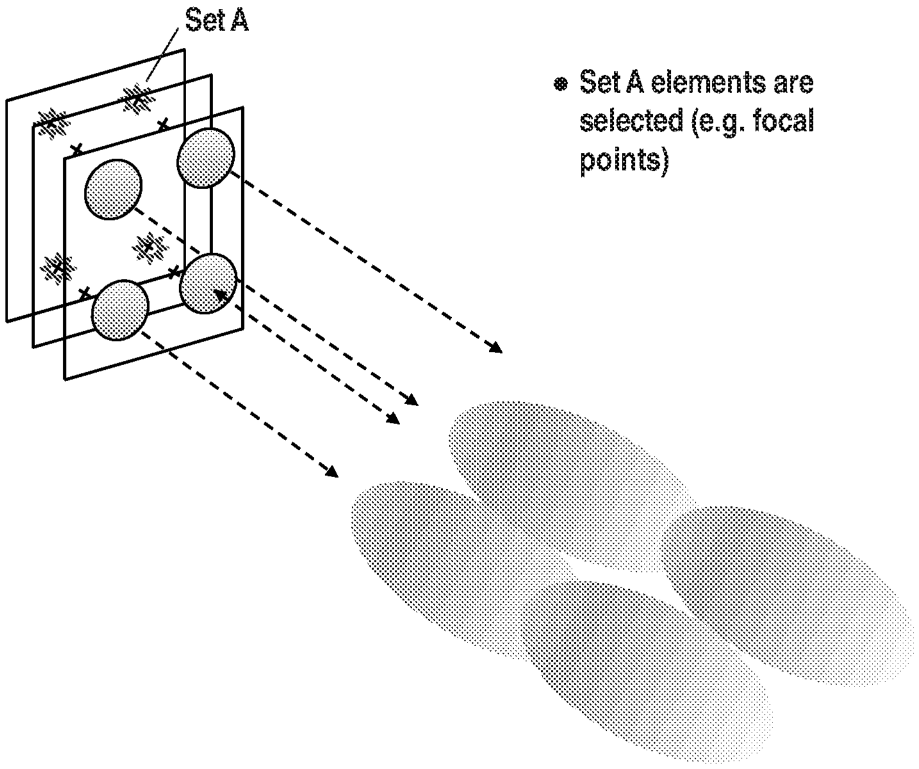
FIGS. 10A-10B are diagrams illustrating the beam shapes of the lens antenna array of FIG. 9.
Figure 10B:
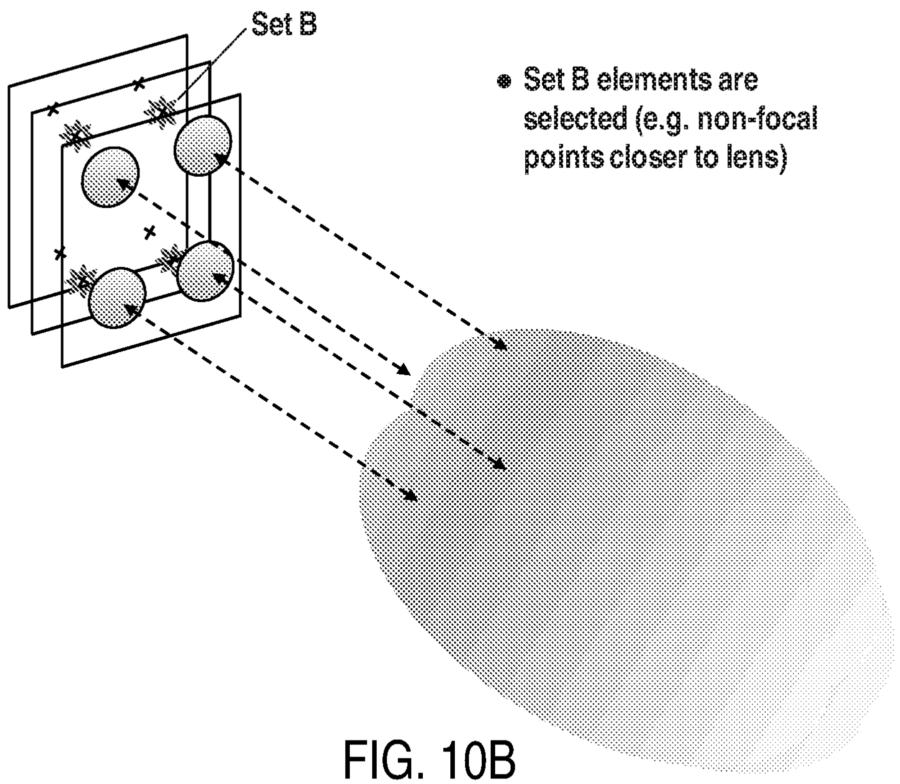

FIGS. 10A-10B are diagrams illustrating the beam shapes of the lens antenna array of FIG. 9. FIG. 10A illustrates the scenario where the set A of antenna elements are selected which are disposed on imaginary surfaces with a distance to the center points of the lenses being equal to the focal length of the lenses. As shown in FIG. 10A, separate beams can be obtained, by which different users at different locations can be served by separate beams. FIG. 10B illustrates the scenario where the set B of antenna elements are selected which are disposed on imaginary surfaces with a distance to the center points of the lenses being smaller than the focal length of the lenses. As shown in FIG. 10B, overlapped beams can be obtained, by which a user at the overlapped area can be served by different beams simultaneously.

Figure 11:
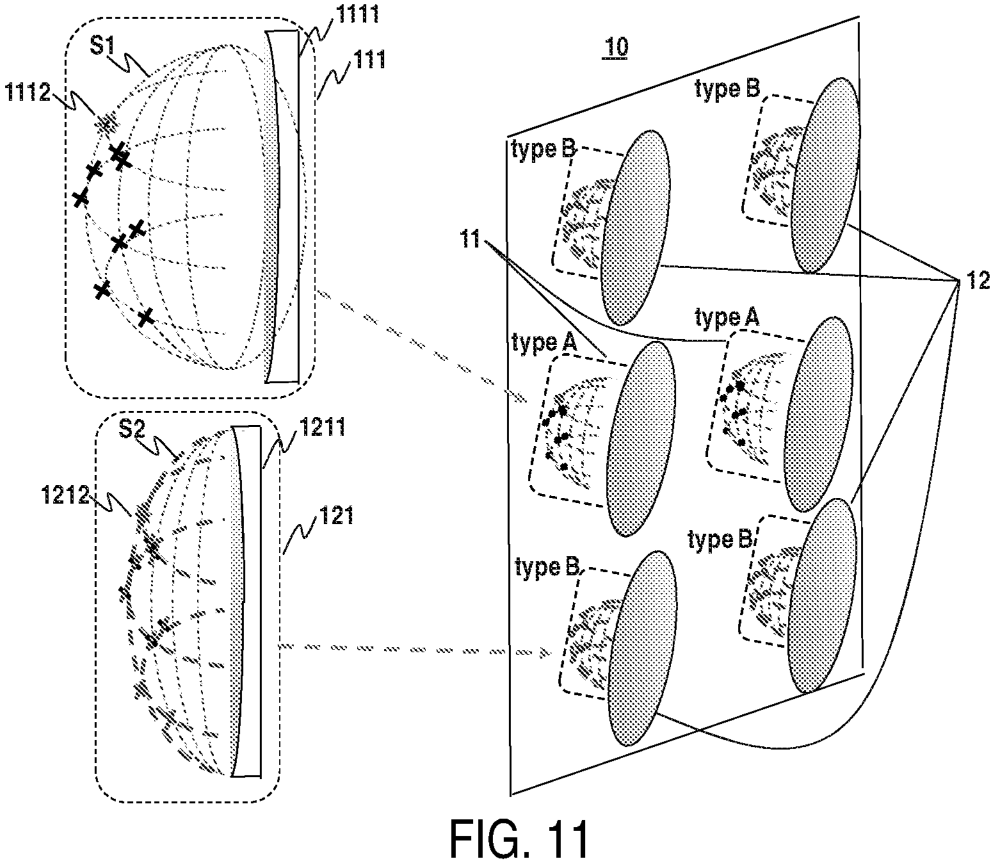
FIG. 11 is a diagram illustrating a lens antenna array according to an embodiment of the disclosure.

FIG. 11 is a diagram illustrating a lens antenna array according to an embodiment of the disclosure. For example, the lens antenna array may be an LAAA. As shown, the lens antenna array 10 comprises a first sub-array 11 of first lens antennas 111 and a second sub-array 12 of second lens antennas 121. Each of the first lens antennas 111 comprises a first lens 1111, and a first set 1112 of antenna elements disposed on a first imaginary spherical surface S1 on a lateral side of the first lens 1111. Each of the second lens antennas 121 comprises a second lens 1211, and a second set 1212 of antenna elements disposed on a second imaginary spherical surface S2 on the same lateral side of the second lens 1211. The second lens 1211 is the same as the first lens 1111. A distance from the first imaginary spherical surface S1 to a center point of the first lens 1111 is a focal length of the first lens 1111. A distance from the second imaginary spherical surface S2 to a center point of the second lens 1211 is smaller than a focal length of the second lens 1211 and thus smaller than the focal length of the first lens 1111. Thus, the first lens antennas 111 differ from the second lens antennas 121 in the distance from the imaginary spherical surface to the center point of the lens. Similar to the embodiments of FIGS. 4-9, since the lens antenna array 10 has different antenna elements with different distances to the center points of the lenses, it is possible to provide a desirable beam width for cellular communication scenario.

In the embodiment of FIG. 11, since different spherical surfaces (corresponding to type A and type B respectively) have different distances to the lens centers, the beam width (or beam shape) can be changed from one to another (e.g. from W1 to W2 shown in FIG. 4, or vice versa) if the antenna elements on the spherical surface A or B are selected as active radio antenna elements. For example, if surface A set of antenna elements are selected to be active, the resulting beam is narrow as a pencil beam since the surface A is a focal-point sphere. In contrast, if surface B set of antenna elements are selected to be active, the consequential beam width is wider than that with the surface A, since the antenna elements within the set B are relatively closer to the lens center than those located at the surface A. Thus, multiple such spherical surfaces could enable an electrical beam width management by surface selection.

For example, for the lens antenna array (e.g. an LAAA) of FIG. 11, antenna activations may be carried out at least between different types. Further, the selections of antenna element activations may be in 3D domains: sub-array type (e.g. type A or type B), elevation in a sphere and azimuth in a sphere. By such a selection, the selected antenna elements may form an antenna sub-array and the signal processing at baseband is to work with this antenna sub-array. As a result, the dimension can be substantially reduced especially for the LAAA with a lot of elements in total. This could mitigate the complexity of the LAAA by partially replacing traditional complicated analogue beamforming circuitry with lens and antenna selection. Besides, the power saving could be facilitated by the non-powered lens, which is also robust in performance over a long duration of operations.

Figure 12A:
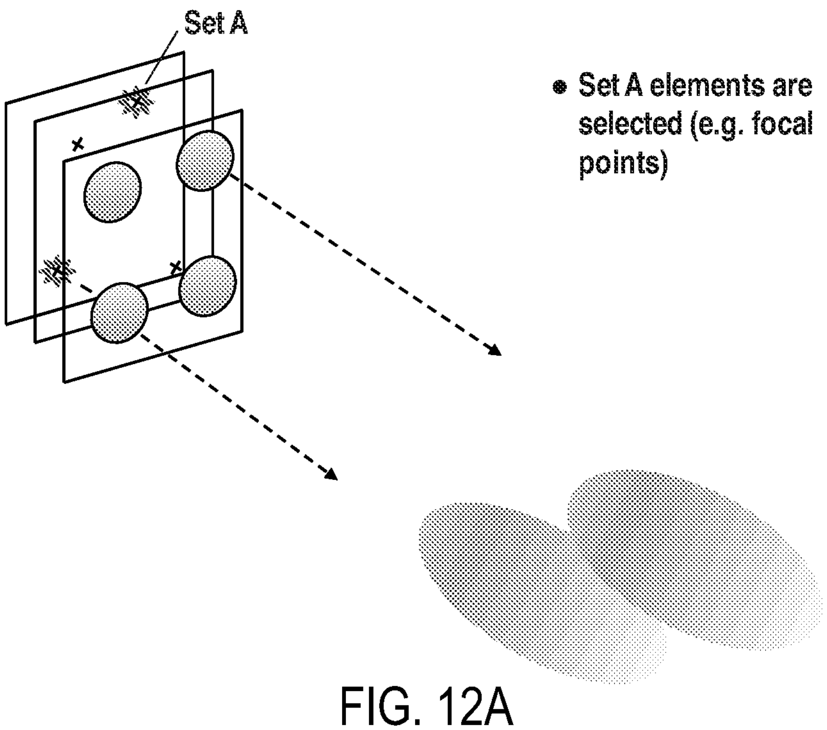
FIGS. 12A-12B are diagrams illustrating the beam shapes of the lens antenna array of FIG. 11.
Figure 12B:
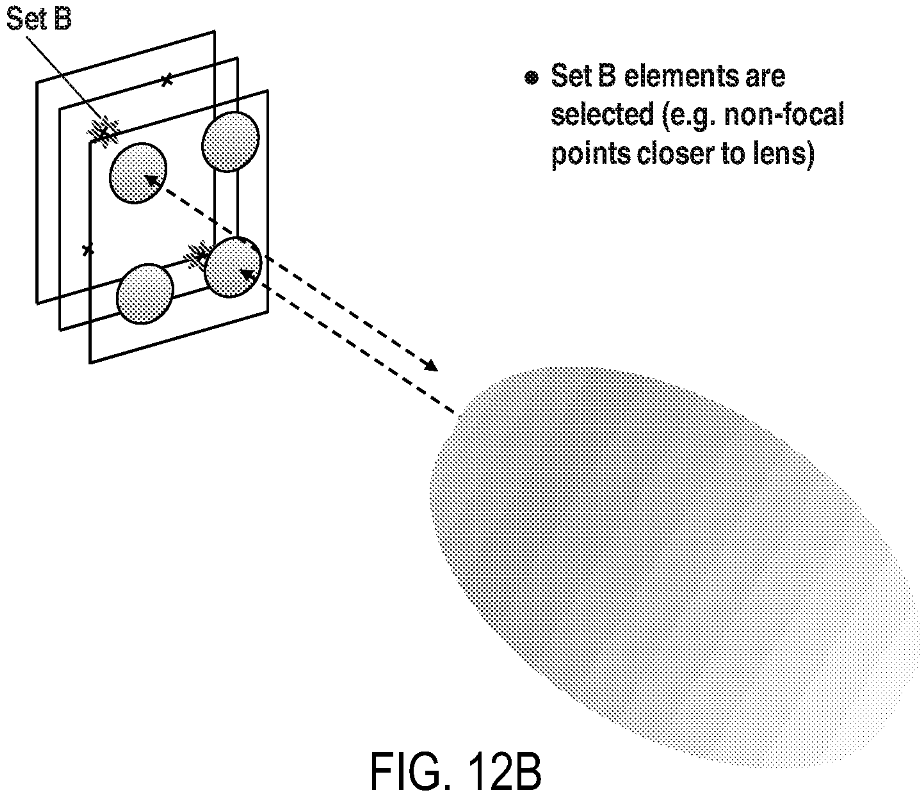

FIGS. 12A-12B are diagrams illustrating the beam shapes of the lens antenna array of FIG. 11. FIG. 12A illustrates the scenario where the set A of antenna elements are selected which are disposed on imaginary surfaces with a distance to the center points of the lenses being equal to the focal length of the lenses. As shown in FIG. 12A, separate beams can be obtained, by which different users at different locations can be served by separate beams. FIG. 12B illustrates the scenario where the set B of antenna elements are selected which are disposed on imaginary surfaces with a distance to the center points of the lenses being smaller than the focal length of the lenses. As shown in FIG. 12B, overlapped beams can be obtained, by which a user at the overlapped area can be served by different beams simultaneously.

Figure 13:
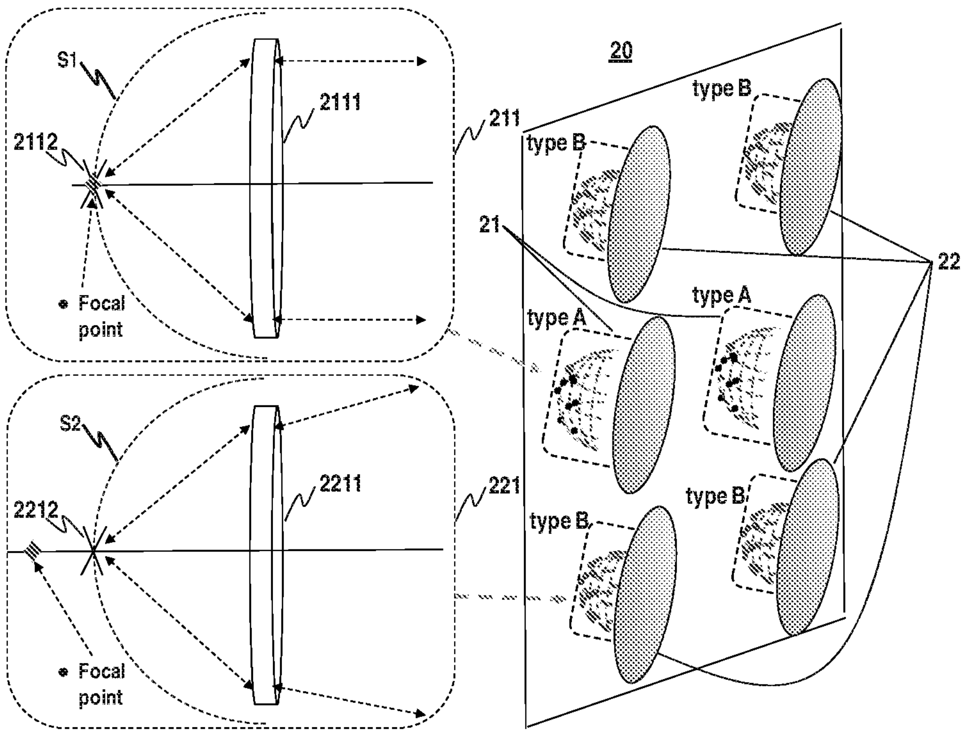
FIG. 13 is a diagram illustrating a lens antenna array according to an embodiment of the disclosure.

FIG. 13 is a diagram illustrating a lens antenna array according to an embodiment of the disclosure. As shown, the lens antenna array 20 comprises a first sub-array 21 of first lens antennas 211 and a second sub-array 22 of second lens antennas 221. Each of the first lens antennas 211 comprises a first lens 2111, and a first set 2112 of antenna elements disposed on a first imaginary spherical surface S1 on a lateral side of the first lens 2111. Each of the second lens antennas 221 comprises a second lens 2211, and a second set 2212 of antenna elements disposed on a second imaginary spherical surface S2 on the same lateral side of the second lens 2211. The second lens 2211 has a larger focal length than the first lens 2111. A first distance from the first imaginary spherical surface S1 to a center point of the first lens 2111 is a focal length of the first lens 2111. A second distance from the second imaginary spherical surface S2 to a center point of the second lens 2211 is smaller than a focal length of the second lens 2211, but is the same as the first distance. Thus, the first lens antennas 211 differ from the second lens antennas 221 in the focal length of the lens. As shown in FIG. 13, due to the different focal lengths of the lenses, two beams with different beam widths can be provided. Consequently, it is possible to provide a desirable beam width for cellular communication scenario.

It should be noted that the present disclosure is not limited to the above examples shown in FIGS. 11-13. Firstly, the first sub-array may include one or more first lens antennas and the second sub-array may include one or more second lens antennas. The number of the first or second lens antennas may be any suitable value, depending on the engineering requirements and the target's needs. Secondly, each of the first set and the second set may include one or more antenna elements. Thirdly, any other suitable curved surface (e.g. an ellipsoidal surface) besides the spherical surface or a planar surface may be used instead. In addition, as long as the first sub-array and the second sub-array can result in different beam widths, every imaginary surface may be disposed at the focal point of the lens, or closer to the center point of the lens than the focal point, or farther away from the center point of the lens than the focal point. It is also possible that the first lens antennas may differ from the second lens antennas in both the distance from the imaginary surface to the center point of the lens and the focal length of the lens.

Based on the above description, a third aspect of the disclosure provides a lens antenna array. The lens antenna array comprises a first sub-array of first lens antennas each comprising a first lens, and a first set of antenna elements disposed on a first imaginary surface on a lateral side of the first lens. The lens antenna array further comprises a second sub-array of second lens antennas each comprising a second lens, and a second set of antenna elements disposed on a second imaginary surface on the same lateral side of the second lens. The first lens antennas differ from the second lens antennas in one of: a distance from the imaginary surface to a center point of the lens; or a focal length of the lens.

Figure 14:
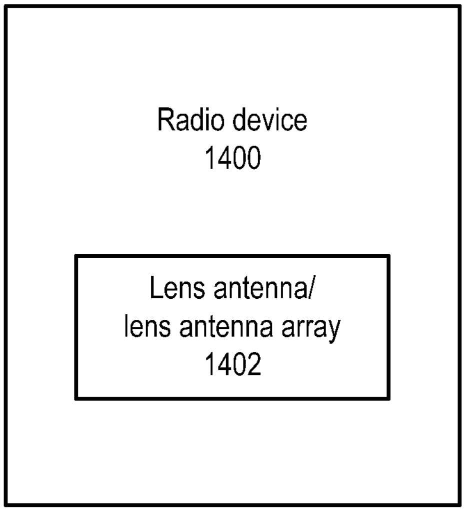
FIG. 14 is a block diagram illustrating a radio device according to an embodiment of the disclosure.

FIG. 14 is a block diagram illustrating a radio device according to an embodiment of the disclosure. For example, the radio device may be an active antenna system (AAS) or a base station. The base station may be, for example, a node B (NodeB), an evolved NodeB (eNodeB or eNB), a next generation NodeB (gNodeB or gNB), a relay, an integrated access backhaul (IAB), a low power node such as a femto, a pico, and so forth. As shown, the radio device 1400 comprises a lens antenna/lens antenna array 1402. The lens antenna 1402 may be the lens antenna according to the above first aspect. The lens antenna array 1402 may be the lens antenna array according to the above second or third aspect.

Optionally, the radio device may be configured to determine a target subset of the antenna elements of the lens antenna or the lens antenna array which is to be used for signal transmission or reception. For example, each antenna element in the lens antenna or the lens antenna array may be connected with a switch element for activation or deactivation of the antenna element. For the signal transmission scenario, if the radio device comprises the lens antenna according to the above first aspect, the radio device may be configured to determine the target subset which is to be used for signal transmission by being configured to select one of the two or more sets of antenna elements which is disposed on one of the two or more imaginary surfaces, based on a size of a beam coverage for use in the signal transmission. The selected one of the two or more sets may be used as the target subset. Further, depending on the specific application scenario, the radio device may be optionally configured to select a portion of the selected one of the two or more sets of antenna elements, based on at least one of a beam elevation and a beam azimuth. Then the selected portion may be used as the target subset.

If the radio device comprises the lens antenna array according to the above second aspect, the radio device may be configured to determine the target subset which is to be used for signal transmission by being configured to select, for each of the plurality of lens antennas, one of the two or more sets of antenna elements which is disposed on one of the two or more imaginary surfaces, based on a size of a beam coverage for use in the signal transmission. The selected sets of antenna elements may be determined as the target subset. Further, depending on the specific application scenario, the radio device may be optionally configured to select a portion of the selected sets of antenna elements, based on at least one of a beam elevation and a beam azimuth. Then the selected portion may be used as the target subset.

If the radio device comprises the lens antenna array according to the above third aspect, the radio device may be configured to determine the target subset which is to be used for signal transmission by being configured to select one of the first sub-array and the second sub-array, based on a size of a beam coverage for use in the signal transmission. The selected one of the first sub-array and the second sub-array may be determined as the target subset. Further, depending on the specific application scenario, the radio device may be optionally configured to select a portion of the selected one of the first sub-array and the second sub-array, based on at least one of a beam elevation and a beam azimuth. Then the selected portion may be used as the target subset.

For the signal reception scenario, the radio device may be configured to determine the target subset which is to be used for signal reception by being configured to select, as the target subset, a portion of the antenna elements of the lens antenna or the lens antenna array which has a signal reception strength greater than or equal to a predetermined threshold. In this way, the complexity of the signal reception processing can be reduced compared with the existing lens antenna/lens antenna array.

It is also possible that the radio device may be configured to determine the target subset which is to be used for signal transmission or reception by being configured to select, as the target subset, the whole antenna elements of the lens antenna or the lens antenna array. This may correspond to the massive MIMO scenario.

Figure 15:
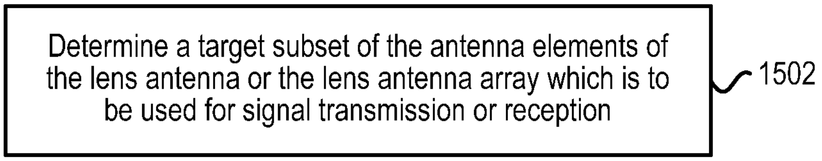
FIG. 15 is a flowchart illustrating a method performed by a radio device according to an embodiment.

FIG. 15 is a flowchart illustrating a method performed by a radio device according to an embodiment. The radio device comprises a lens antenna according to the above first aspect or a lens antenna array according to the above second or third aspect. At block 1502, the radio device determines a target subset of the antenna elements of the lens antenna or the lens antenna array which is to be used for signal transmission or reception. Since the target subset is determined for further processing, it is possible to flexibly control the signal transmission or reception.

Figure 16:
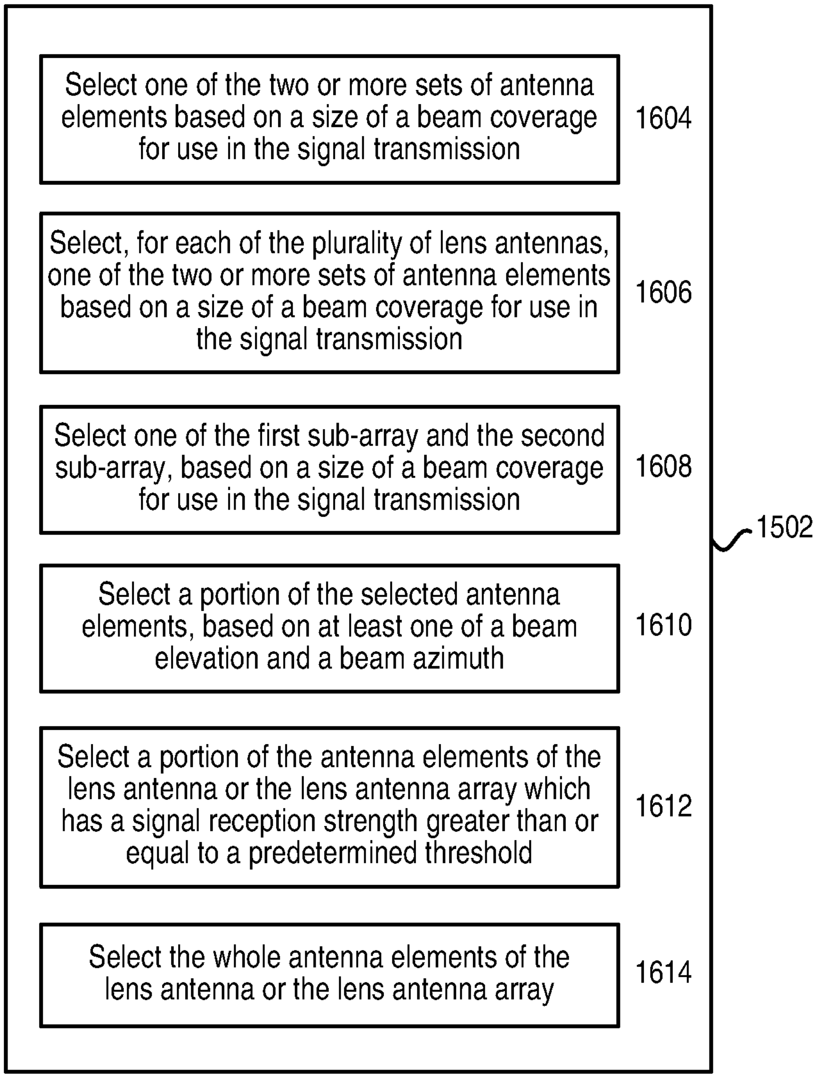
FIG. 16 is a flowchart for explaining the method of FIG. 15.

As shown in FIG. 16, for the signal transmission scenario, in the case where the radio device comprises the lens antenna according to the above first aspect, block 1502 may be implemented as block 1604. At block 1604, the radio device selects one of the two or more sets of antenna elements which is disposed on one of the two or more imaginary surfaces, based on a size of a beam coverage for use in the signal transmission. The selected one of the two or more sets may be used as the target subset. Depending on the specific application scenario, block 1502 may optionally further include block 1610. At block 1610, the radio device selects a portion of the selected one of the two or more sets of antenna elements, based on at least one of a beam elevation and a beam azimuth. Then the selected portion may be used as the target subset.

In the case where the radio device comprises the lens antenna array according to the above second aspect, block 1502 may be implemented as block 1606. At block 1606, the radio device selects, for each of the plurality of lens antennas, one of the two or more sets of antenna elements which is disposed on one of the two or more imaginary surfaces, based on a size of a beam coverage for use in the signal transmission. The selected sets of antenna elements may be determined as the target subset. Depending on the specific application scenario, block 1502 may optionally further include block 1610. At block 1610, the radio device selects a portion of the selected sets of antenna elements, based on at least one of a beam elevation and a beam azimuth. Then the selected portion may be used as the target subset.

In the case where the radio device comprises the lens antenna array according to the above third aspect, block 1502 may be implemented as block 1608. At block 1608, the radio device selects one of the first sub-array and the second sub-array, based on a size of a beam coverage for use in the signal transmission. The selected one of the first sub-array and the second sub-array may be determined as the target subset. Depending on the specific application scenario, block 1502 may optionally further include block 1610. At block 1610, the radio device selects a portion of the selected one of the first sub-array and the second sub-array, based on at least one of a beam elevation and a beam azimuth. Then the selected portion may be used as the target subset.

For the signal reception scenario, block 1502 may be implemented as block 1612. At block 1612, the radio device selects, as the target subset, a portion of the antenna elements of the lens antenna or the lens antenna array which has a signal reception strength greater than or equal to a predetermined threshold.

Alternatively, block 1502 may be implemented as block 1614. At block 1614, the radio device selects, as the target subset, the whole antenna elements of the lens antenna or the lens antenna array.

As an exemplary example, for the lens antenna array shown in FIG. 9 or FIG. 11, for a wider coverage, a wider beam width should be enabled. In such a case, the antenna element sets on the spherical surfaces closer to the lenses may be selected and named as Active-Set-A (such as sphere B in FIG. 9 or FIG. 11). Otherwise, the antenna element sets on the spherical surfaces farther from the lenses may be selected as Active-Set-A (such as sphere A FIG. 9 or FIG. 11). In this way, adjustable radio beam widths can be provided to meet the requirement of robust mobility performance or broadcasting. Then, the elevation of the beam may be determined by considering the beam coverage since it is affected by the elevation of the beam. To implement the adjustment of the elevation, a subset within Active-Set-A antenna elements may be further chosen as Active-Set-B by choosing the corresponding antenna elements at equal elevations above the boresight of the lens. Then, within Active-Set-B, an antenna element (or a pair of antenna elements with cross-polarizations) may be selected for signal transmission for each of the lenses according to beam azimuth. In this way, adaptive beam directions in elevation and azimuth can be provided. Then, baseband signal processing may be carried out for either transmission or reception on the antenna(s) selected for each of the lenses, which form a new sub-array of antenna elements. This sub-array is of a squeezed spatial dimension, which could be beneficial to reduce the complexity of signal processing especially for an LAAA. This is especially crucial if the LAAA works with an ultra-wide bandwidth, where a huge dimension caused by time/frequency/spatial domain could become problematic to the requirement of short signal processing latency.

Figure 17:
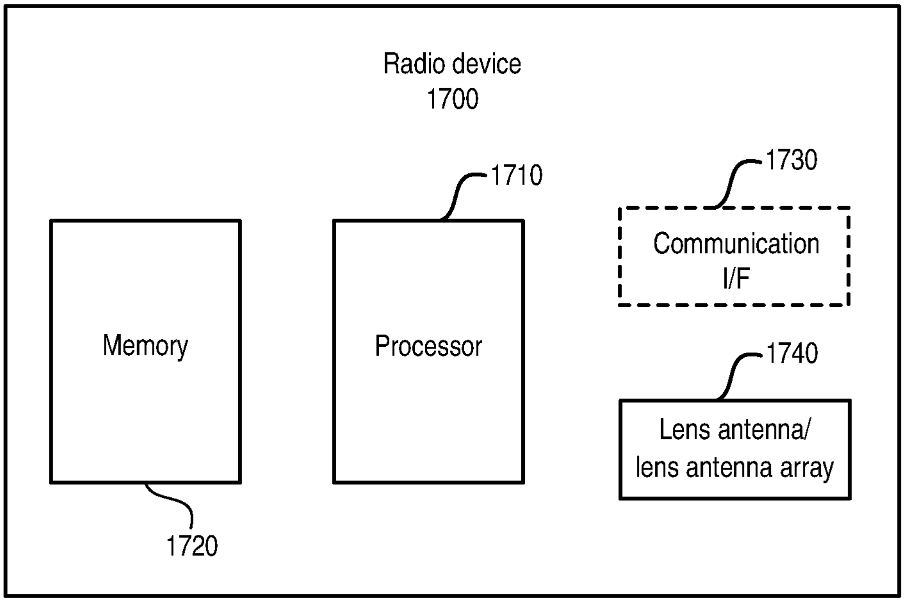
FIG. 17 is a block diagram illustrating a radio device according to an embodiment of the disclosure.

FIG. 17 is a block diagram illustrating a radio device according to an embodiment of the disclosure. As shown, the radio device 1700 comprises a lens antenna/lens antenna array 1740, a processor 1710, a memory 1720 that stores a program, and optionally a communication interface 1730 for communicating data with other external devices through wired and/or wireless communication. The lens antenna 1740 may be the lens antenna according to the above first aspect. The lens antenna array 1740 may be the lens antenna array according to the above second or third aspect.

The program includes program instructions that, when executed by the processor 1710, enable the radio device 1700 to operate in accordance with the embodiments of the present disclosure, as discussed above. That is, the embodiments of the present disclosure may be implemented at least in part by computer software executable by the processor 1710, or by hardware, or by a combination of software and hardware.

The memory 1720 may be of any type suitable to the local technical environment and may be implemented using any suitable data storage technology, such as semiconductor based memory devices, flash memories, magnetic memory devices and systems, optical memory devices and systems, fixed memories and removable memories. The processor 1710 may be of any type suitable to the local technical environment, and may include one or more of general purpose computers, special purpose computers, microprocessors, digital signal processors (DSPs) and processors based on multi-core processor architectures, as non-limiting examples.

Unless otherwise defined, all terms used herein (including technical and scientific terms) have the same meaning as commonly understood by those skilled in the art. It should be further understood that terms, such as those defined in commonly used dictionaries, should be interpreted as having a meaning that is consistent with their meaning in the context of the specification and the relevant art and should not be interpreted in an ideal or excessively formal sense unless clearly defined in the present disclosure.

The terminology used herein is for the purpose of describing particular embodiments only and is not intended to limit the present disclosure. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components, but do not preclude the presence or addition of one or more other features, elements, components and/or combinations thereof. As used herein, the statement that two or more parts are “coupled”, “connected” or “cascaded” together shall mean that the parts are joined together either directly or joined through one or more intermediate parts.

It should be understood that, although the terms “first”, “second” and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It is to be understood that the orientation or position relationships indicated by the terms such as "top", "bottom", "left", "right", etc. are the orientation or position relationships based on the drawings, which are only used to facilitate the description of the present disclosure or simplify the description, and are not intended to indicate or suggest that the members, components or apparatuses should have the specific orientations, or should be manufactured and operated in the specific orientations. Therefore, the terms should not be construed as limiting the present disclosure.

As used herein, the term "examples" particularly when followed by a listing of terms is merely exemplary and illustrative, and should not be deemed to be exclusive. It should be noted that various aspects of the present disclosure may be implemented individually or in combination with one or more other aspects. Furthermore, the detailed description and specific embodiments are intended for purposes of illustration only and are not intended to limit the scope of the disclosure.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A lens antenna, comprising:
a lens; and
two or more sets of antenna elements which are respectively disposed on two or more imaginary surfaces on a lateral side of the lens, wherein the two or more imaginary surfaces have different distances to a center point of the lens.

2. The lens antenna according to claim 1, wherein each of the two or more imaginary surfaces is a curved surface.

3. The lens antenna according to claim 2, wherein the curved surface is a spherical surface.

4. The lens antenna according to claim 1, wherein each of the two or more imaginary surfaces is a planar surface.

5. The lens antenna according to claim 1, wherein the distance from one of the two or more imaginary surfaces to the center point of the lens is a focal length of the lens; and
wherein the distance from a different one of the two or more imaginary surfaces to the center point of the lens is larger or smaller than the focal length of the lens.

6. The lens antenna according to claim 1, wherein the distance from each of the two or more imaginary surfaces to the center point of the lens is larger or smaller than the focal length of the lens.

7. A lens antenna array, comprising:
a first sub-array of first lens antennas each comprising a first lens, and a first set of antenna elements disposed on a first imaginary surface on a lateral side of the first lens; and
a second sub-array of second lens antennas each comprising a second lens, and a second set of antenna elements disposed on a second imaginary surface on the same lateral side of the second lens,
wherein the first lens antennas differ from the second lens antennas in one of: a distance from the imaginary surface to a center point of the lens or a focal length of the lens.

8. The lens antenna array according to claim 7, wherein each of the first and second imaginary surfaces is a curved surface.

9. The lens antenna array according to claim 8, wherein the curved surface is a spherical surface.

10. The lens antenna array according to claim 7, wherein each of the first and second imaginary surfaces is a planar surface.

11. The lens antenna array according to claim 7, wherein a distance from the first imaginary surface to a center point of the first lens is a focal length of the first lens, and
wherein a distance from the second imaginary surface to a center point of the second lens is larger or smaller than a focal length of the second lens.

12. The lens antenna array according to claim 7, wherein a distance from the first imaginary surface to a center point of the first lens is larger or smaller than a focal length of the first lens, and
wherein a distance from the second imaginary surface to a center point of the second lens is a focal length of the second lens.

13. The lens antenna array according to claim 7, wherein a distance from the first imaginary surface to a center point of the first lens is larger or smaller than a focal length of the first lens, and
wherein a distance from the second imaginary surface to a center point of the second lens is larger or smaller than a focal length of the second lens.

14. A radio device comprising:
a lens antenna, comprising:
a lens; and
two or more sets of antenna elements which are respectively disposed on two or more imaginary surfaces on a lateral side of the lens, wherein the two or more imaginary surfaces have different distances to a center point of the lens according.

15. The radio device according to claim 14, further configured to determine a target subset of the antenna elements of the lens antenna which is to be used for signal transmission or reception.

16. The radio device according to claim 15, wherein the radio device is further configured to determine the target subset which is to be used for signal transmission by being configured to:
select one of the two or more sets of antenna elements which is disposed on one of the two or more imaginary surfaces, based on a size of a beam coverage for use in the signal transmission.

17. The radio device according to claim 15, wherein the radio device is further configured to determine the target subset which is to be used for signal transmission or reception by being configured to:

select, as the target subset, the whole antenna elements of the lens antenna.

18. The radio device according to claim 14, wherein the radio device is one of:

an active antenna system (AAS); and a base station.

* * * * *